United States Patent Office 2,953,583
Patented Sept. 20, 1960

2,953,583
12α HALO STEROIDS OF THE ANDROSTANE SERIES

Josef Fried, Princeton, N.J., assignor to Olin Mathieson Chemical Corporation, New York, N.Y., a corporation of Virginia No Drawing. Filed May 9, 1958, Ser. No. 734,104

11 Claims. (Cl. 260—397.3)

This application is a continuation-in-part of my parent application, Serial No. 576,258, filed April 5, 1956, now abandoned. This invention relates to the synthesis of valuable steroids, and more particularly to the synthesis of steroids of the androstane series.

One of the objects of this invention is the provision of an advantageous process of preparing steroids of the androstane (including androstene and etiocholane) series having a 12α-fluoro (or chloro) substituent and an 11β-hydroxy (or 11-keto) substituent.

Another object of this invention is the provision of certain compounds useful for their own physiological activity.

The compounds of this invention comprise steroids of the androstane series having a 12α-fluoro (or chloro) substituent and an 11β-hydroxy or 11-keto substituent. the corresponding 12α-halo-11β-hydroxy (or 11-keto) steroids of this invention can be obtained by oxidizing the corresponding 12α-halo-11β-hydroxy (or 11-keto) steroids of the pregnane series.

Among the compounds of this invention are those of the general formula:

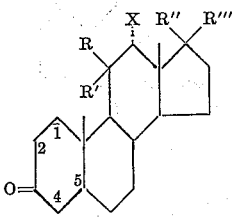

wherein the 1,2 and 4,5-positions are either double-bonded or saturated (preferably the 1,2-position is saturated, and the 4,5-position is double-bonded), R is hydrogen, R' is β-hydroxy or together R and R' is keto, R'' is hydrogen, R''' is β-hydroxy or together R'' and R''' is keto, and X is chloro or fluoro.

Examples of 12α-fluoro (or chloro)-11β-hydroxy (or 11-keto) steroids of the androstane series preparable by the process of this invention include: 12α-chloro-Δ⁴-androstene - 11β - ol - 3,17 - dione; 12α - chloro - Δ⁴- androstene -3,11,17 - trione; 12α - fluoro - Δ⁴ - androstene- 11β - ol - 3,17 - dione; 12α - fluoro - Δ⁴ - androstene- 3,11,17 - trione; 12α - fluoro (or chloro) - androstane- 11β - ol - 3,17-dione; 12α - fluoro (or chloro) - androstane- 3,11,17 - trione; 12α - fluoro (or chloro) - etiocholane- 11β - ol - 3,17 - dione; and 12α - fluoro (or chloro)- etiocholane - 3,11,17 - trione.

The 12α-halo-11β-hydroxy (or 11-keto) steroids of the pregnane series, utilizable as starting materials in the process of this invention can be prepared by the method disclosed in our application Serial No. 576,259, filed April 5, 1956. These 12α-halo-steroids of the pregnane series are of the general formula

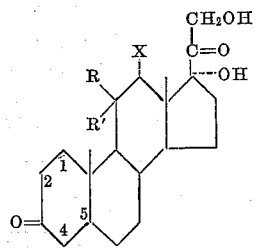

wherein the 1,2 and 4,5-positions are either double-bonded or saturated, and R, R', and X are as hereinbefore defined. Representative 12α-halo steroids of the pregnane series included: 12α-chlorocortisone; 12α-fluorocortisone; 12α-chlorohydrocortisone; 12α - fluorohydrocortisone; 12α-chloroallopregnane - 17α,21 - diol - 3,11,20 - trione; 12α-fluoroallopregnane - 17α,21 - diol - 3,11,20 - trione; 12α-fluoroallopregnane - 11β,17α,21 - triol - 3,20 - dione; 12α-chloro - Δ¹,⁴ - pregnadiene - 17α,21 - diol - 3,11,20 - trione; 12α - fluoro - Δ¹,⁴ - pregnadiene - 17α,21 - diol - 3,11,20- trione; and 12α - fluoro - Δ¹,⁴ - pregnadiene - 11β,17β,21- triol - 3,20 - dione.

The conversion of the 12α-halo steroids of the pregnane series into the corresponding 12α-halo steroids of the androstane series is best effected by reacting the former with an oxidizing agent in an acid solution. Suitable oxidizing agents included compounds containing a hexavalent chromic ion (e.g. chromic oxide) or compounds containing a bismuthate ion (e.g. alkali metal bismuthate such as sodium bismuthate). Glacial acetic acid may be used as a suitable solvent. The reaction is most desirably conducted at room temperature. If an 11β-hydroxy steroid of the pregnane series is used as a reactant, the androstane derivative formed will depend on the oxidizing agent employed. Thus if chromic oxide in glacial acetic acid is used, an 11-keto derivative is formed, whereas, if sodium bismuthate is employed, the 11β-hydroxy radical is unaffected and an 11β-hydroxy androstane derivative is produced.

The 12α-fluoro (or chloro)-11β-hydroxy (or 11-keto) steroids of the androstane series are useful as androgens, since, unlike the corresponding 12α-bromo or iodo derivatives, they possess testoid activity. Accordingly, the compounds of this invention can be used in lieu of known androgenic steroids, such as testosterone and methyltestosterone; thus, they may be administered perorally in the treatment of eunichoidism, being formulated for such administration in the same type of preparations as testosterone, for example, with concentration and/or dosage based on the activity of the particular compound.

The following examples are illustrative of the invention (all temperatures being in centigrade):

EXAMPLE 1

*12α-chloro-Δ⁴-androstene-3,11,17-trione*

A solution of 50 mg. of 12α-chlorocortisone in 4 ml. of glacial acetic acid and 4 ml. of water is shaken with 350 mg. of sodium bismuthate at room temperature for 40 minutes. The mixture is filtered and the filter cake washed thoroughly with chloroform. After separation of the phases, the chloroform solution is washed with sodium bicarbonate and water, dried over sodium sulfate and evaporated to dryness in vacuo. The residue upon crystallization from 95% alcohol produces 12α-chloro-Δ⁴-androstene-3,11,17-trione having the following properties: M.P. about 201–202°:

$\lambda_{max}^{alc}$ 235 mμ; $\lambda_{max}^{Nujol}$ 5.73 μ, 5.85 μ, 599 μ, 6.19 μ

EXAMPLE 2

To a solution of 100 mg. of 12α-chlorocortisone in 5 ml. of glacial acetic acid is added a solution of 120 mg. of chromic acid in 6 ml. of glacial acetic acid. After one hour at room temperature 0.5 ml. of alcohol is added and after an additional 5 minutes, the solution is evaporated to near-dryness. The residue is distributed between 5 ml. of water and 20 ml. of chloroform, and the resulting chloroform solution extracted with water, dilute sodium bicarbonate and again with water. After drying over sodium sulfate, the chloroform is removed in vacuo and the chloroform residue is crystallized from acetone-hexane affording 12α-chloro-Δ⁴-androstene-3,11,17-trione, identical with the compound prepared in Example 1.

EXAMPLE 3

*12α-fluoro-Δ⁴-androstene-3,11,17-trione*

By substituting 50 mg. of 12α-fluorocortisone for the 12α-chlorocortisone in the procedure of Example 1, 12α-fluoro-Δ⁴-androstene-3,11,17-trione is obtained.

EXAMPLE 4

*12α-chloro-Δ⁴-androstene-11β-ol-3,17-dione*

By substituting 50 mg. of 12α-chlorohydrocortisone for the 12α-chlorocortisone in the procedure of Example 1, 12α-chloro-Δ⁴-androstene-11β-ol-3,17-dione is produced.

Similarly, by substituting an equivalent amount of 12α-fluorohydrocortisone for the 12α-chlorocortisone in the procedure of Example 1, there is obtained 12α-fluoro-Δ⁴-androstene-11β-ol-3,17-dione.

EXAMPLE 5

*12α-chloro-Δ¹,⁴-androstadiene-3,11,17-trione*

By substituting 50 mg. of 12α-chloro-Δ¹,⁴-pregnadiene-17α,21-diol-3,11,20-trione for the 12α-chlorocortisone in the procedure of Example , 12α-chloro-Δ¹,⁴-androstadiene-3,11,17-trione is formed.

Similarly other 12α-fluoro-Δ¹,⁴-androstadiene-3,11,17-trione can be prepared from 12α-fluoro-Δ¹,⁴-pregnadiene-17α,21-diol-3,11,20-trione.

EXAMPLE 6

*12α-chloro-androstane-3,11,17-trione*

By replacing the 12α-chlorocortiosone in Example 1 with 40 mg. of 12α-chloroallopregnane-17α,21-diol-3,11,20-trione, there is formed 12α-chloroandrostane-3,11,17-trione.

Similarly 12α-fluoro-androstane-3,11,17-trione and 12α-fluoro (or chloro)-androstane-11β-ol-3,17-diones can be prepared from 12α-fluoro-allopregnane-17α,21-diol-3,11,20-trione and 12α-fluoro (or chloro)-allopregnane-11β,17α,21-triol-3,20-dione, respectively.

Aside from their use as androgens, the compounds of this invention are also useful intermediates in the preparation of the 17β-hydroxy androstane derivatives. Thus the 12α-fluoro (or chloro)-17-keto steroids of the invention can be converted to 3-ethylene ketals or enamine derivatives of a secondary base (e.g. pyrrolidine) in the usual manner, and the resulting derivatives, with the 3-keto group protected, can be reacted with an alkali boron or aluminum hydride to furnish the corresponding 17β-hydroxy derivatives (if the oxygen at 11 is ketonic an 11β-hyroxy group will result).

The invention may be variously otherwise embodied within the scope of the appended claims.

I claim:

1. 12α-chloro-Δ⁴-androstene-3,11,17-trione.
2. 12α-fluoro-Δ⁴-androstene-3,11,17-trione.
3. 12α-chloro-Δ⁴-androstene-11β-ol-3,17-dione.
4. 12α-chloro-Δ¹,⁴-androstadiene-3,11,17-trione.
5. 12α-chloro-androstane-3,11,17-trione.
6. The process for preparing a compound selected from the group consisting of steroids of the general formulae

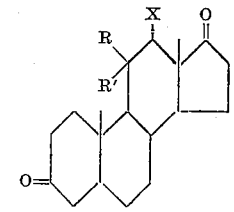 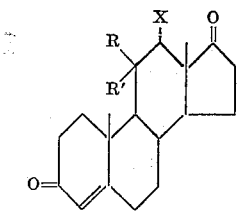

and

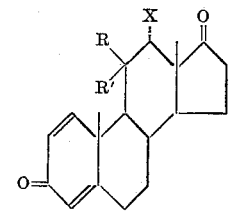

wherein R is hydrogen, R' is β-hydroxy, and together R and R' is keto, and X is selected from the group consisting of fluoro and chloro, which comprises treating a corresponding steroid selected from the group consisting of those of the general formulae

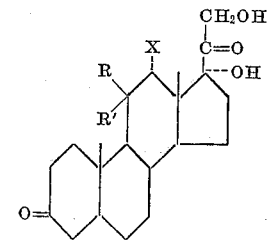 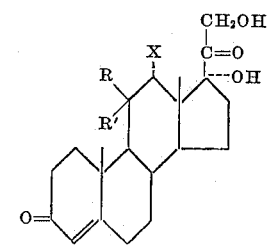

and

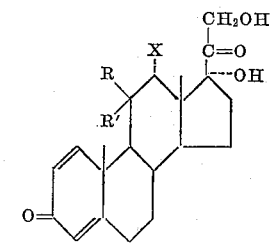

wherein R, R' and X are as above defined, with an oxidizing agent containing a bismuthate ion in an acidic medium.

7. The process of claim 6, wherein the oxidizing agent is sodium bismuthate.

8. The process of claim 6, wherein the steroid is 12α-chlorocortisone.

9. The process of claim 6, wherein the steroid is 12α-chlorohydrocortisone.

10. The process of claim 6, wherein the steroid is 12α-chloro-Δ¹,⁴-pregnadiene-17α,21-diol-3,11,20-trione.

11. A compound selected from the group consisting of steroids of the general formulae:

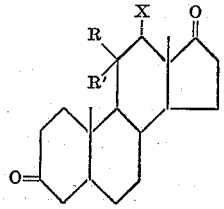 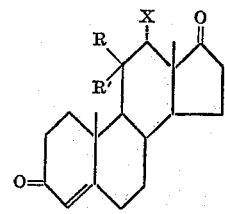

and
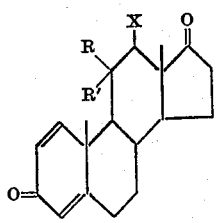
wherein R is hydrogen, R' is β-hydroxy, and together R and R' is keto, and X is selected from the group consisting of fluoro and chloro.
References Cited in the file of this patent
UNITED STATES PATENTS
2,776,302    Ruzicka et al.    Jan. 1, 1957
2,813,109    Colton et al.    Nov. 12, 1957
OTHER REFERENCES
Meystre et al.: Helv. Chim. Acta., vol. 32, pages 1978–92 (1949).
Fieser and Fieser: Natural Products Related to Phenanthrene (3rd Edition, 1949), page 423.

UNITED STATES PATENT OFFICE
CERTIFICATE OF CORRECTION

Patent No. 2,953,583                      September 20, 1960

Josef Fried

It is hereby certified that error appears in the printed specification of the above numbered patent requiring correction and that the said Letters Patent should read as corrected below.

Column 1, line 30, for "the carresponding 12α-halo-11β-hydroxy (or 11-keto)" read -- The 12α-halo-11β-hydroxy (or 11-keto) --, and should appear as the beginning of a new paragraph; column 3, line 42, for "Example" read -- Example 1 --; column 3, line 63, for "the", second occurence, read -- this --.

Signed and sealed this 25th day of April 1961.

(SEAL)
Attest:

ERNEST W. SWIDER
Attesting Officer

DAVID L. LADD
Commissioner of Patents